June 9, 1953   J. DEPALLENS   2,641,364
FILTER FOR PURIFYING A LIQUID OR GASEOUS FLUID
Filed Sept. 27, 1947   2 Sheets-Sheet 1

Inventor
Jules Depallens
By E. Freeman
Attorney.

June 9, 1953     J. DEPALLENS     2,641,364
FILTER FOR PURIFYING A LIQUID OR GASEOUS FLUID Filed Sept. 27, 1947     2 Sheets-Sheet 2

Patented June 9, 1953

2,641,364

UNITED STATES PATENT OFFICE 2,641,364

FILTER FOR PURIFYING A LIQUID OR GASEOUS FLUID

Jules Depallens, Lausanne, Switzerland

Application September 27, 1947, Serial No. 776,454
In Switzerland June 14, 1946

Section 1, Public Law 690, August 8, 1946
Patent expires June 14, 1966

1 Claim. (Cl. 210—167)

The invention concerns an improved filter for purifying a liquid or gaseous fluid.

The drawing represents, by way of example, a vertical axial section of a form of construction according to the invention, shown in position for use.

This filter is provided with additional inlet and outlet pipes for sending a reverse stream of compressed air or pressure steam through the sieve for cleansing it periodically.

Figure 1:
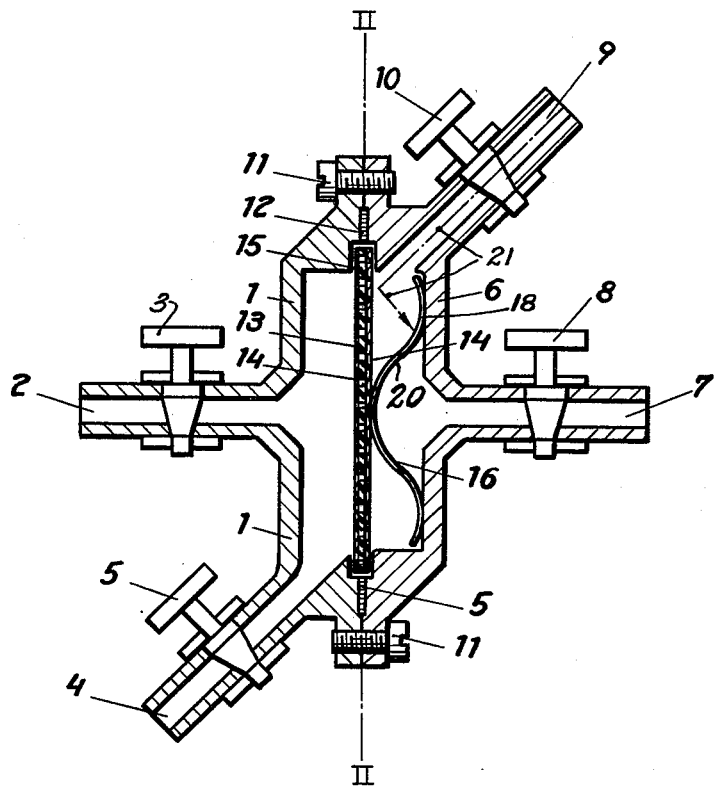
Fig. 1 is a sectional, diametral view of the filter.
Figure 2:
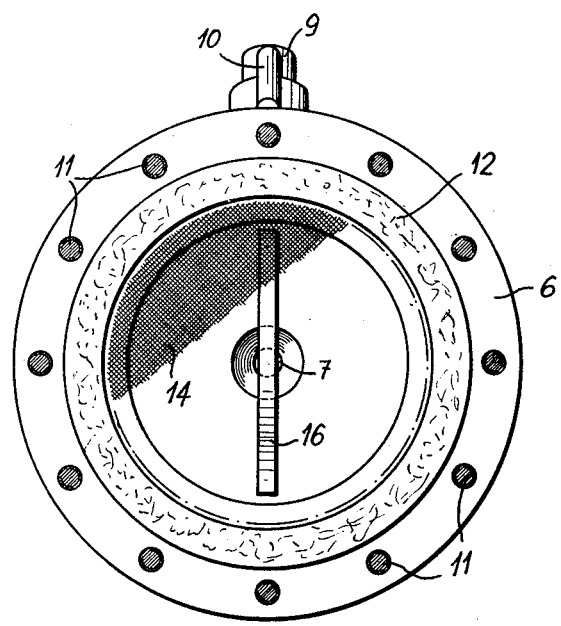
Fig. 2 is a vertical front view of the same, taken at right angle to the plane of Fig. 1, the first part of the casing being removed.

On the drawing, 1 designates a first cup-shaped part of a casing intended to occupy a vertical position, and disposed on the inlet side of a liquid or gaseous fluid to be purified; first part carries in its center an inlet pipe 2, closable by a cock 3, and on its periphery a drain pipe 4 provided with a closing cock 5, the filter being intended to be placed in such a position that said pipe should be at the lower part. The second cup-shaped part 6 of the casing, disposed on the outlet side of the purified fluid, carries in its center a departure pipe 7, closable by a cock 8, and in its upper part, an upper pipe 9, provided with a closing cock 10, for letting in compressed air or pressure steam to cleanse the filter. The two vertical cup-shaped casing parts 1 and 6 are tightly assembled by means of screws 11 and a packing 12. A filtering sieve, formed by a central supple diaphragm 13 of permeable material suitable for the effective filtering of the fluid to be filtered, pressed between two gauzes 14, is held in place by grooves 15 of flanges 1 and 6. The vibratile gauzes 14 having a transverse flexibility are tightly mounted on their periphery in the grooves 15. A spring 16, placed within the second cup-shaped part 6, on the outlet side thereof, bears on the one side against the inner vertical wall of this flange 6, and on the other side against the sieve formed by the diaphragm 13 and the gauzes 14. The axis of upper pipe 9 is inclined to the sieve assembly 13—14 and cross the same at an eccentric point near the top thereof. The corrugated spring band 16 is located in a precompression state between a bearing wall 18 of the second cup-shaped part 6 and the central portion of the sieve assembly 13—14. This band comprises a portion 20 arranged substantially across a gaseous jet introduced through the auxiliary upper pipe 9 after this jet has been partly deflected by the sieve assembly substantially along the dotted line 21.

The filter being disposed as shown, with the sieve in vertical position, for the purifying, both cocks 3 and 8 are open, and both cocks 5 and 10 are closed. The fluid to be purified comes in through the pipe 2 into the flange 1, and then, on account of the vertical position of the casing formed by the two cup-shaped parts 1 and 6, it deposits by gravity, and owing to the slowing down of its speed resulting from the cross-obstacle formed by the sieve 13, 14, a part of its impurities in the bottom of this cup-shaped part 1 and then it passes through the diaphragm 13 and the gauzes 14, leaving on the front face of the sieve the remainder of its impurities, retained thereon. The thus purified fluid then comes out of the casing by the pipe 7 of the rear cup-shaped part 6.

For cleansing the casing formed by the cup-shaped parts 1 and 6, and the sieve constituted by the diaphragm 13 and the gauzes 14, the cocks 3 and 8 are closed; the drain pipe 4 is open by means of the cock 5; the cock 10 of the pipe 9 is open and this pipe is connected to a source of compressed air or of pressure steam; this air or steam comes to press against the diaphragm 13 and the gauzes 14 and progressively goes through them, driving back the impurities deposited on this diaphragm and gauzes. These impurities fall on the bottom of the cup-shaped part 1 and are evacuated by the drain pipe 4. The spring 16 is agitated by the passage of the compressed air or pressure steam and sets in vibration the diaphragm 13 and the gauzes 14, against which it presses, contributing thereby to complete their cleansing.

As a matter of fact, the compressed air suddenly admitted in the cup-shaped part 6 on opening of cock 10 when obliquely coming upon the sieve assembly 13—14, is partly deflected therefrom to hit the portion 20 of the spring back 16 and thus promotes the vibratory motion of the same.

What I claim is:

A filter for purifying a liquid or gaseous fluid comprising in combination a casing consisting of two cup-shaped parts, means for removably and tightly assembling said cup-shaped parts, by their periphery, a vertical and substantially plane sieve assembly tightly mounted on its periphery within said casing between the edges of said casing parts, said sieve assembly comprising a supple diaphragm of a fluid permeable material suitable for filtering purposes, pressed between two gauzes having a transverse flexibility, one of said cup-shaped parts being provided with a central inlet pipe and at its lower edge with a drain pipe, the opening of which in said cup-shaped part facing the sieve assembly at a lowest point thereof, a valve in said inlet pipe, a valve in said drain pipe, the second of said cup-shaped parts being provided with a central outlet pipe and at its upper edge, with an auxiliary rectilinear pipe, the axis of which being inclined to said sieve assembly and crossing the same at an upper point thereof said second cup-shaped part having an internal bearing wall; a valve in said outlet pipe and a valve in said auxiliary pipe; said auxiliary pipe and valve thereof being adapted to allow an intermittent introduction of a compressed gaseous jet upon said upper point of the sieve assembly, therefrom said jet is partly deflected, a corrugated spring band located in a pre-compression state between said bearing wall and a central portion of said sieve assembly, said band comprising a portion substantially arranged across said deflected gaseous jet, so that said spring band is adapted to be set into vibration by said deflected gaseous jet, thus contributing to promote a vibratory motion of said sieve assembly for cleaning purpose.

JULES DEPALLENS.

References Cited in the file of this patent

UNITED STATES PATENTS

| Number | Name | Date |
|---|---|---|
| 399,260 | Haefner | Mar. 12, 1889 |
| 634,953 | Mueller | Oct. 17, 1899 |
| 1,063,047 | Lohrmann | May 27, 1913 |
| 1,495,825 | Von Gunten | May 27, 1924 |
| 1,646,513 | Winton | Oct. 25, 1927 |
| 1,693,471 | Weinberg | Nov. 27, 1928 |
| 1,730,360 | Fisher | Oct. 8, 1929 |
| 2,083,148 | Coulombe | June 8, 1937 |
| 2,463,814 | Skinner | Mar. 8, 1949 |

FOREIGN PATENTS

| Number | Country | Date |
|---|---|---|
| 693,614 | France | Nov. 22, 1930 |